US010225179B2

(12) United States Patent
Chu et al.

(10) Patent No.: US 10,225,179 B2
(45) Date of Patent: *Mar. 5, 2019

(54) VIRTUAL PORT CHANNEL BOUNCE IN OVERLAY NETWORK

(71) Applicant: Cisco Technology, Inc., San Jose, CA (US)

(72) Inventors: Kit Chiu Chu, Fremont, CA (US); Thomas J. Edsall, Los Gatos, CA (US); Navindra Yadav, Cupertino, CA (US); Francisco M. Matus, Saratoga, CA (US); Krishna Doddapaneni, Cupertino, CA (US); Satyam Sinha, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,696

(22) Filed: Dec. 5, 2016

(65) Prior Publication Data
US 2017/0085469 A1   Mar. 23, 2017

Related U.S. Application Data

(63) Continuation of application No. 14/508,909, filed on Oct. 7, 2014, now Pat. No. 9,544,224.
(Continued)

(51) Int. Cl.
*H04L 12/703* (2013.01)
*H04L 12/18* (2006.01)
(Continued)

(52) U.S. Cl.
CPC .............. *H04L 45/28* (2013.01); *H04L 12/18* (2013.01); *H04L 12/4633* (2013.01);
(Continued)

(58) Field of Classification Search
CPC ..... H04L 43/0811; H04L 43/10; H04L 43/50; H04L 12/4641; H04L 49/30; H04L 49/557
See application file for complete search history.

(56) References Cited

U.S. PATENT DOCUMENTS 4,298,770 A   11/1981  Nishihara et al.
4,636,919 A   1/1987   Itakura et al.
(Continued)

FOREIGN PATENT DOCUMENTS

CN   103297552   9/2013
CN   104639464   5/2015
(Continued)

OTHER PUBLICATIONS

Abdo, E., "HOST_ID TCP Options: Implementation & Preliminary Test Results," Network Working Group Internet Draft draft-abdo-hostid-tcpopt-implementation-03, Jul. 16, 2012, 30 pages; http://tools.ietf.org/pdf/draft-abdo-hostid-tcpopt-implementation-03.pdf.
(Continued)

*Primary Examiner* — Ayaz R Sheikh
*Assistant Examiner* — Debebe A Asefa
(74) *Attorney, Agent, or Firm* — Polsinelli PC

(57) ABSTRACT

Aspects of the subject disclosure provide methods for avoiding a packet bounce event in a virtual port channel (VPC). A method of the technology can include steps for detecting a link failure event (e.g., between a first network device and a destination node), and receiving a data packet addressed to the destination node. In some implementations, the method can additionally include steps for rewriting encapsulation information of the first data packet. Systems and computer-readable media are also provided.

20 Claims, 5 Drawing Sheets

Related U.S. Application Data

(60) Provisional application No. 61/900,333, filed on Nov. 5, 2013.

(51) Int. Cl.

| | |
|---|---|
| *H04L 12/755* | (2013.01) |
| *H04L 12/46* | (2006.01) |
| *H04L 12/26* | (2006.01) |
| *H04L 12/741* | (2013.01) |
| *H04L 29/12* | (2006.01) |
| *H04L 12/751* | (2013.01) |
| *H04L 29/06* | (2006.01) |
| *H04L 12/58* | (2006.01) |
| *H04L 29/08* | (2006.01) |
| *H04L 12/707* | (2013.01) |
| *H04L 12/709* | (2013.01) |
| *H04L 12/723* | (2013.01) |
| *H04L 12/24* | (2006.01) |
| *H04L 12/931* | (2013.01) |
| *H04L 12/753* | (2013.01) |
| *H04L 12/743* | (2013.01) |
| *H04L 12/715* | (2013.01) |
| *H04L 12/803* | (2013.01) |

(52) U.S. Cl.
CPC ...... *H04L 12/4641* (2013.01); *H04L 12/4645* (2013.01); *H04L 41/0654* (2013.01); *H04L 43/0811* (2013.01); *H04L 43/0852* (2013.01); *H04L 43/0894* (2013.01); *H04L 43/16* (2013.01); *H04L 45/02* (2013.01); *H04L 45/021* (2013.01); *H04L 45/22* (2013.01); *H04L 45/24* (2013.01); *H04L 45/245* (2013.01); *H04L 45/48* (2013.01); *H04L 45/50* (2013.01); *H04L 45/74* (2013.01); *H04L 45/745* (2013.01); *H04L 45/7453* (2013.01); *H04L 49/70* (2013.01); *H04L 51/14* (2013.01); *H04L 61/2503* (2013.01); *H04L 61/2592* (2013.01); *H04L 67/10* (2013.01); *H04L 69/22* (2013.01); *H04L 45/64* (2013.01); *H04L 47/125* (2013.01); *H04L 2212/00* (2013.01)

(56) References Cited

U.S. PATENT DOCUMENTS

| | | | |
|---|---|---|---|
| 4,700,016 A | 10/1987 | Hitchcock et al. | |
| 5,115,431 A | 5/1992 | Williams et al. | |
| 5,859,835 A | 1/1999 | Varma et al. | |
| 5,926,458 A | 7/1999 | Yin et al. | |
| 6,230,231 B1 | 5/2001 | DeLong et al. | |
| 6,389,031 B1 | 5/2002 | Chao et al. | |
| 6,677,831 B1 | 1/2004 | Cheng et al. | |
| 6,714,553 B1 | 3/2004 | Poole et al. | |
| 6,757,897 B1 | 6/2004 | Shi et al. | |
| 6,769,033 B1 | 7/2004 | Bass et al. | |
| 6,876,952 B1 | 4/2005 | Kappler et al. | |
| 6,907,039 B2 | 6/2005 | Shen | |
| 6,941,649 B2 | 9/2005 | Goergen | |
| 6,952,421 B1 | 10/2005 | Slater | |
| 6,954,463 B1 | 10/2005 | Ma et al. | |
| 6,996,099 B1 | 2/2006 | Kadambi et al. | |
| 7,068,667 B2 * | 6/2006 | Foster ................ | H04L 49/357 370/397 |
| 7,152,117 B1 | 12/2006 | Stapp et al. | |
| 7,177,946 B1 | 2/2007 | Kaluve et al. | |
| 7,372,857 B1 | 5/2008 | Kappler et al. | |
| 7,379,459 B2 | 5/2008 | Ohnishi | |
| 7,411,915 B1 | 8/2008 | Spain et al. | |
| 7,426,604 B1 | 9/2008 | Rygh et al. | |
| 7,463,590 B2 | 12/2008 | Mualem et al. | |
| 7,516,211 B1 | 4/2009 | Gourlay et al. | |
| 7,539,131 B2 | 5/2009 | Shen | |
| 7,580,409 B1 | 8/2009 | Swenson et al. | |
| 7,630,368 B2 | 12/2009 | Tripathi et al. | |
| 7,674,244 B2 | 3/2010 | Sweeney | |
| 7,729,296 B1 | 6/2010 | Choudhary | |
| 7,742,406 B1 | 6/2010 | Muppala | |
| 7,826,469 B1 | 11/2010 | Li et al. | |
| 7,940,763 B1 | 5/2011 | Kastenholz | |
| 8,170,025 B2 | 5/2012 | Kloth et al. | |
| 8,190,843 B1 | 5/2012 | de Forest et al. | |
| 8,195,736 B2 | 6/2012 | Malloy et al. | |
| 8,233,384 B2 | 7/2012 | Osterhout et al. | |
| 8,302,301 B2 | 11/2012 | Lau | |
| 8,325,459 B2 | 12/2012 | Mutnury et al. | |
| 8,339,973 B1 | 12/2012 | Pichumani et al. | |
| 8,369,335 B2 | 2/2013 | Jha et al. | |
| 8,378,223 B1 | 2/2013 | Shiue et al. | |
| 8,442,063 B1 | 5/2013 | Zhou et al. | |
| 8,509,087 B2 | 8/2013 | Rajagopalan et al. | |
| 8,514,712 B1 | 8/2013 | Aswadhati | |
| 8,605,575 B2 | 12/2013 | Gunukula et al. | |
| 8,687,629 B1 | 4/2014 | Kompella et al. | |
| 8,868,766 B1 | 10/2014 | Theimer et al. | |
| 8,874,876 B2 | 10/2014 | Bhadra et al. | |
| 8,908,691 B2 | 12/2014 | Biswas et al. | |
| 8,995,272 B2 | 3/2015 | Agarwal et al. | |
| 9,036,481 B1 | 5/2015 | White | |
| 9,053,070 B1 | 6/2015 | Arguelles | |
| 9,106,508 B2 | 8/2015 | Banavalikar et al. | |
| 9,178,715 B2 | 11/2015 | Jain et al. | |
| 9,197,551 B2 | 11/2015 | DeCusatis et al. | |
| 9,197,553 B2 | 11/2015 | Jain et al. | |
| 9,203,188 B1 | 12/2015 | Siechen et al. | |
| 9,203,753 B2 | 12/2015 | Leung et al. | |
| 9,258,195 B1 | 2/2016 | Pendleton et al. | |
| 9,274,710 B1 | 3/2016 | Oikarinen et al. | |
| 9,325,524 B2 | 4/2016 | Banavalikar et al. | |
| 9,374,294 B1 | 6/2016 | Pani | |
| 9,402,470 B2 | 8/2016 | Shen et al. | |
| 9,407,501 B2 | 8/2016 | Yadav et al. | |
| 9,426,060 B2 | 8/2016 | Dixon et al. | |
| 9,433,081 B1 | 8/2016 | Xiong et al. | |
| 9,444,634 B2 | 9/2016 | Pani | |
| 9,502,111 B2 | 11/2016 | Dharmapurikar et al. | |
| 9,509,092 B2 | 11/2016 | Shen et al. | |
| 9,544,185 B1 | 1/2017 | Yadav et al. | |
| 9,544,224 B2 | 1/2017 | Chu et al. | |
| 9,590,914 B2 | 3/2017 | Attar et al. | |
| 9,602,424 B1 | 3/2017 | Vincent et al. | |
| 9,627,063 B2 | 4/2017 | Dharmapurikar et al. | |
| 9,634,846 B2 | 4/2017 | Pani | |
| 9,635,937 B2 | 5/2017 | Shen et al. | |
| 9,654,300 B2 | 5/2017 | Pani | |
| 9,654,385 B2 | 5/2017 | Chu et al. | |
| 9,654,409 B2 | 5/2017 | Yadav et al. | |
| 9,655,232 B2 | 5/2017 | Saxena et al. | |
| 9,667,431 B2 | 5/2017 | Pani | |
| 9,667,551 B2 | 5/2017 | Edsall et al. | |
| 9,669,459 B2 | 6/2017 | Guthrie et al. | |
| 9,674,086 B2 | 6/2017 | Ma et al. | |
| 9,686,180 B2 | 6/2017 | Chu et al. | |
| 9,698,994 B2 | 7/2017 | Pani | |
| 9,710,407 B2 | 7/2017 | Oikarinen et al. | |
| 9,716,665 B2 | 7/2017 | Attar et al. | |
| 9,729,387 B2 | 8/2017 | Agarwal et al. | |
| 9,742,673 B2 | 8/2017 | Banerjee et al. | |
| 9,755,965 B1 | 9/2017 | Yadav et al. | |
| 9,769,078 B2 | 9/2017 | Attar et al. | |
| 9,876,715 B2 | 1/2018 | Edsall et al. | |
| 2002/0126671 A1 | 9/2002 | Ellis et al. | |
| 2002/0136268 A1 | 9/2002 | Gan et al. | |
| 2002/0146026 A1 | 10/2002 | Unitt et al. | |
| 2003/0035385 A1 | 2/2003 | Walsh et al. | |
| 2003/0058837 A1 | 3/2003 | Denney et al. | |
| 2003/0058860 A1 | 3/2003 | Kunze et al. | |
| 2003/0067924 A1 | 4/2003 | Choe et al. | |
| 2003/0097461 A1 | 5/2003 | Barham et al. | |
| 2003/0115319 A1 | 6/2003 | Dawson et al. | |
| 2003/0123462 A1 | 7/2003 | Kusayanagi | |

(56) References Cited

U.S. PATENT DOCUMENTS

| | | |
|---|---|---|
| 2003/0137940 A1 | 7/2003 | Schwartz et al. |
| 2003/0142629 A1 | 7/2003 | Krishnamurthi et al. |
| 2003/0174650 A1 | 9/2003 | Shankar et al. |
| 2003/0223376 A1 | 12/2003 | Elliott et al. |
| 2003/0231646 A1 | 12/2003 | Chandra et al. |
| 2004/0062259 A1 | 4/2004 | Jeffries et al. |
| 2004/0073715 A1 | 4/2004 | Folkes et al. |
| 2004/0100901 A1 | 5/2004 | Bellows |
| 2004/0103310 A1 | 5/2004 | Sobel et al. |
| 2004/0111507 A1 | 6/2004 | Villado et al. |
| 2004/0160956 A1 | 8/2004 | Hardy et al. |
| 2004/0249960 A1 | 12/2004 | Hardy et al. |
| 2005/0007961 A1 | 1/2005 | Scott et al. |
| 2005/0013280 A1 | 1/2005 | Buddhikot et al. |
| 2005/0073958 A1 | 4/2005 | Atlas et al. |
| 2005/0083933 A1 | 4/2005 | Fine et al. |
| 2005/0091239 A1 | 4/2005 | Ward et al. |
| 2005/0144290 A1 | 6/2005 | Mallal et al. |
| 2005/0175020 A1 | 8/2005 | Park et al. |
| 2005/0201375 A1 | 9/2005 | Komatsu et al. |
| 2005/0207410 A1 | 9/2005 | Adhikari et al. |
| 2005/0213504 A1 | 9/2005 | Enomoto et al. |
| 2005/0232227 A1 | 10/2005 | Jorgenson et al. |
| 2006/0028285 A1 | 2/2006 | Jang et al. |
| 2006/0031643 A1 | 2/2006 | Figueira |
| 2006/0075093 A1 | 4/2006 | Frattura et al. |
| 2006/0083179 A1 | 4/2006 | Mitchell |
| 2006/0083256 A1 | 4/2006 | Mitchell |
| 2006/0182036 A1 | 8/2006 | Sasagawa et al. |
| 2006/0183488 A1 | 8/2006 | Billhartz |
| 2006/0198315 A1 | 9/2006 | Sasagawa et al. |
| 2006/0209688 A1 | 9/2006 | Tsuge et al. |
| 2006/0209702 A1 | 9/2006 | Schmitt et al. |
| 2006/0215572 A1 | 9/2006 | Padhye et al. |
| 2006/0215623 A1 | 9/2006 | Lin et al. |
| 2006/0221835 A1 | 10/2006 | Sweeney |
| 2006/0239204 A1 | 10/2006 | Bordonaro et al. |
| 2006/0250982 A1 | 11/2006 | Yuan et al. |
| 2006/0268742 A1 | 11/2006 | Chu et al. |
| 2006/0274657 A1 | 12/2006 | Olgaard et al. |
| 2006/0280179 A1 | 12/2006 | Meier |
| 2006/0285500 A1 | 12/2006 | Booth, III et al. |
| 2007/0016590 A1 | 1/2007 | Appleby et al. |
| 2007/0025241 A1 | 2/2007 | Nadeau et al. |
| 2007/0053303 A1 | 3/2007 | Kryuchkov |
| 2007/0058557 A1 | 3/2007 | Cuffaro et al. |
| 2007/0061451 A1 | 3/2007 | Villado et al. |
| 2007/0076605 A1 | 4/2007 | Cidon et al. |
| 2007/0091795 A1 | 4/2007 | Bonaventure et al. |
| 2007/0097872 A1 | 5/2007 | Chiu |
| 2007/0104198 A1 | 5/2007 | Kalluri et al. |
| 2007/0133566 A1 | 6/2007 | Copps |
| 2007/0159987 A1 | 7/2007 | Khan et al. |
| 2007/0160073 A1 | 7/2007 | Toumura et al. |
| 2007/0211625 A1 | 9/2007 | Liu et al. |
| 2007/0223372 A1 | 9/2007 | Haalen et al. |
| 2007/0233847 A1 | 10/2007 | Aldereguia et al. |
| 2007/0258382 A1 | 11/2007 | Foll et al. |
| 2007/0258383 A1 | 11/2007 | Wada |
| 2007/0274229 A1 | 11/2007 | Scholl et al. |
| 2007/0280264 A1 | 12/2007 | Milton et al. |
| 2008/0031130 A1 | 2/2008 | Raj et al. |
| 2008/0031146 A1 | 2/2008 | Kwak et al. |
| 2008/0031247 A1 | 2/2008 | Tahara et al. |
| 2008/0092213 A1 | 4/2008 | Wei et al. |
| 2008/0147830 A1 | 6/2008 | Ridgill et al. |
| 2008/0151863 A1 | 6/2008 | Lawrence et al. |
| 2008/0177896 A1 | 7/2008 | Quinn et al. |
| 2008/0219173 A1 | 9/2008 | Yoshida et al. |
| 2008/0225853 A1 | 9/2008 | Melman et al. |
| 2008/0243495 A1 | 10/2008 | Anandakumar et al. |
| 2008/0253366 A1 | 10/2008 | Zuk et al. |
| 2008/0259809 A1 | 10/2008 | Stephan et al. |
| 2008/0259925 A1 | 10/2008 | Droms et al. |
| 2008/0298360 A1 | 12/2008 | Wijnands et al. |
| 2008/0310421 A1 | 12/2008 | Teisberg et al. |
| 2009/0010153 A1 | 1/2009 | Filsfils et al. |
| 2009/0044005 A1 | 2/2009 | Komura et al. |
| 2009/0052332 A1 | 2/2009 | Fukuyama et al. |
| 2009/0086629 A1 | 4/2009 | Zhang et al. |
| 2009/0094357 A1 | 4/2009 | Keohane et al. |
| 2009/0103566 A1* | 4/2009 | Kloth ................. H04L 43/00 370/474 |
| 2009/0116402 A1 | 5/2009 | Yamasaki |
| 2009/0122805 A1 | 5/2009 | Epps et al. |
| 2009/0154459 A1 | 6/2009 | Husak et al. |
| 2009/0188711 A1 | 7/2009 | Ahmad |
| 2009/0193103 A1 | 7/2009 | Small et al. |
| 2009/0225671 A1 | 9/2009 | Arbel et al. |
| 2009/0232011 A1 | 9/2009 | Li et al. |
| 2009/0238179 A1 | 9/2009 | Samprathi |
| 2009/0268614 A1 | 10/2009 | Tay et al. |
| 2009/0271508 A1 | 10/2009 | Sommers et al. |
| 2010/0128619 A1 | 5/2010 | Shigei |
| 2010/0150155 A1 | 6/2010 | Napierala |
| 2010/0189080 A1 | 7/2010 | Hu et al. |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0260197 A1 | 10/2010 | Martin et al. |
| 2010/0265849 A1 | 10/2010 | Harel |
| 2010/0281155 A1 | 11/2010 | Cipollone et al. |
| 2010/0287227 A1 | 11/2010 | Goel et al. |
| 2010/0290472 A1 | 11/2010 | Raman et al. |
| 2010/0299553 A1 | 11/2010 | Cen |
| 2010/0312875 A1 | 12/2010 | Wilerson et al. |
| 2011/0007638 A1 | 1/2011 | Xu et al. |
| 2011/0110241 A1 | 5/2011 | Atkinson et al. |
| 2011/0138310 A1 | 6/2011 | Gomez et al. |
| 2011/0153722 A1 | 6/2011 | Choudhary et al. |
| 2011/0158248 A1 | 6/2011 | Vorunganti et al. |
| 2011/0170426 A1 | 7/2011 | Kompella et al. |
| 2011/0185073 A1 | 7/2011 | Jagadeeswaran et al. |
| 2011/0203834 A1 | 8/2011 | Yoneya et al. |
| 2011/0211578 A1 | 9/2011 | Zwiebel et al. |
| 2011/0213894 A1 | 9/2011 | Silberstein et al. |
| 2011/0228795 A1 | 9/2011 | Agrawal et al. |
| 2011/0249682 A1 | 10/2011 | Kean et al. |
| 2011/0268118 A1 | 11/2011 | Schlansker et al. |
| 2011/0273990 A1 | 11/2011 | Rajagopalan et al. |
| 2011/0274053 A1 | 11/2011 | Baik et al. |
| 2011/0286324 A1 | 11/2011 | Bellagamba et al. |
| 2011/0286447 A1 | 11/2011 | Liu |
| 2011/0299406 A1 | 12/2011 | Vobbilisetty et al. |
| 2011/0310738 A1 | 12/2011 | Lee et al. |
| 2011/0321031 A1 | 12/2011 | Dournov et al. |
| 2012/0007688 A1 | 1/2012 | Zhou et al. |
| 2012/0063318 A1 | 3/2012 | Boddu et al. |
| 2012/0102114 A1 | 4/2012 | Dunn et al. |
| 2012/0147752 A1 | 6/2012 | Ashwood-Smith et al. |
| 2012/0163164 A1 | 6/2012 | Terry et al. |
| 2012/0163396 A1 | 6/2012 | Cheng et al. |
| 2012/0195233 A1 | 8/2012 | Wang et al. |
| 2012/0246307 A1 | 9/2012 | Malloy et al. |
| 2012/0275304 A1 | 11/2012 | Patel et al. |
| 2012/0281697 A1 | 11/2012 | Huang |
| 2012/0300787 A1 | 11/2012 | Korger |
| 2013/0055155 A1 | 2/2013 | Wong et al. |
| 2013/0090014 A1 | 4/2013 | Champion |
| 2013/0097335 A1 | 4/2013 | Jiang et al. |
| 2013/0100810 A1 | 4/2013 | Slothouber |
| 2013/0107889 A1 | 5/2013 | Barabash et al. |
| 2013/0121172 A1 | 5/2013 | Cheng et al. |
| 2013/0124708 A1 | 5/2013 | Lee et al. |
| 2013/0155846 A1 | 6/2013 | Ramachandran et al. |
| 2013/0182712 A1 | 7/2013 | Aguayo et al. |
| 2013/0250951 A1 | 9/2013 | Koganti |
| 2013/0311637 A1 | 11/2013 | Kamath et al. |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0322453 A1 | 12/2013 | Allan |
| 2013/0332399 A1 | 12/2013 | Reddy et al. |

(56) References Cited

U.S. PATENT DOCUMENTS

| | | |
|---|---|---|
| 2013/0332577 A1 | 12/2013 | Nakil et al. |
| 2013/0332602 A1 | 12/2013 | Nakil et al. |
| 2014/0016501 A1 | 1/2014 | Kamath et al. |
| 2014/0043535 A1 | 2/2014 | Motoyama et al. |
| 2014/0047264 A1 | 2/2014 | Wang et al. |
| 2014/0056298 A1 | 2/2014 | Vobbilisetty et al. |
| 2014/0064278 A1 | 3/2014 | Santos et al. |
| 2014/0068750 A1 | 3/2014 | Tjahjono et al. |
| 2014/0086253 A1 | 3/2014 | Yong |
| 2014/0105039 A1 | 4/2014 | Mcdysan |
| 2014/0105062 A1 | 4/2014 | Mcdysan et al. |
| 2014/0105216 A1 | 4/2014 | Mcdysan |
| 2014/0146817 A1 | 5/2014 | Zhang |
| 2014/0146824 A1 | 5/2014 | Angst et al. |
| 2014/0201375 A1 | 7/2014 | Beereddy et al. |
| 2014/0219275 A1 | 8/2014 | Allan et al. |
| 2014/0241353 A1 | 8/2014 | Zhang et al. |
| 2014/0244779 A1 | 8/2014 | Roitshtein et al. |
| 2014/0258465 A1 | 9/2014 | Li |
| 2014/0269705 A1 | 9/2014 | Decusatis et al. |
| 2014/0269710 A1 | 9/2014 | Sundaram et al. |
| 2014/0269712 A1 | 9/2014 | Kidambi |
| 2014/0294005 A1 | 10/2014 | Jain et al. |
| 2014/0307744 A1 | 10/2014 | Dunbar et al. |
| 2014/0321277 A1 | 10/2014 | Lynn, Jr. et al. |
| 2014/0328206 A1 | 11/2014 | Chan et al. |
| 2014/0334295 A1 | 11/2014 | Guichard et al. |
| 2014/0341029 A1 | 11/2014 | Allan et al. |
| 2014/0372582 A1 | 12/2014 | Ghanwani et al. |
| 2015/0009992 A1 | 1/2015 | Zhang |
| 2015/0010001 A1 | 1/2015 | Duda et al. |
| 2015/0058470 A1 | 2/2015 | Duda |
| 2015/0073920 A1 | 3/2015 | Pashkevich et al. |
| 2015/0082418 A1 | 3/2015 | Gu |
| 2015/0092551 A1 | 4/2015 | Moisand et al. |
| 2015/0092593 A1 | 4/2015 | Kompella |
| 2015/0103679 A1 | 4/2015 | Tessmer et al. |
| 2015/0113143 A1 | 4/2015 | Stuart et al. |
| 2015/0124629 A1 | 5/2015 | Pani |
| 2015/0124631 A1 | 5/2015 | Edsall et al. |
| 2015/0124633 A1 | 5/2015 | Banerjee et al. |
| 2015/0124640 A1 | 5/2015 | Chu et al. |
| 2015/0124644 A1 | 5/2015 | Pani |
| 2015/0124806 A1 | 5/2015 | Banerjee et al. |
| 2015/0124817 A1 | 5/2015 | Merchant et al. |
| 2015/0124821 A1 | 5/2015 | Chu et al. |
| 2015/0124822 A1 | 5/2015 | Chu et al. |
| 2015/0124823 A1 | 5/2015 | Pani et al. |
| 2015/0124824 A1 | 5/2015 | Edsall et al. |
| 2015/0124825 A1 | 5/2015 | Dharmapurikar et al. |
| 2015/0124833 A1 | 5/2015 | Ma et al. |
| 2015/0127701 A1 | 5/2015 | Chu et al. |
| 2015/0127797 A1 | 5/2015 | Attar et al. |
| 2015/0188769 A1 | 7/2015 | Gu |
| 2015/0222516 A1 | 8/2015 | Deval et al. |
| 2015/0236900 A1 | 8/2015 | Chung |
| 2015/0271104 A1 | 9/2015 | Chikkamath et al. |
| 2015/0280959 A1 | 10/2015 | Vincent |
| 2015/0378712 A1 | 12/2015 | Cameron et al. |
| 2015/0378969 A1 | 12/2015 | Powell et al. |
| 2016/0036697 A1 | 2/2016 | DeCusatis et al. |
| 2016/0080350 A1 | 3/2016 | Chaturvedi et al. |
| 2016/0119204 A1 | 4/2016 | Murasato et al. |
| 2016/0134563 A1 | 5/2016 | Yu et al. |
| 2016/0149751 A1 | 5/2016 | Pani et al. |
| 2016/0315811 A1 | 10/2016 | Yadav et al. |
| 2017/0104636 A1 | 4/2017 | Vora et al. |
| 2017/0207961 A1 | 7/2017 | Saxena et al. |
| 2017/0214619 A1 | 7/2017 | Chu et al. |
| 2017/0237651 A1 | 8/2017 | Pani |
| 2017/0237678 A1 | 8/2017 | Ma et al. |
| 2017/0250912 A1 | 8/2017 | Chu et al. |
| 2017/0257260 A1 | 9/2017 | Govindan et al. |
| 2017/0288948 A1 | 10/2017 | Singh et al. |
| 2017/0346748 A1 | 11/2017 | Attar et al. |

FOREIGN PATENT DOCUMENTS

| | | |
|---|---|---|
| EP | 2621136 | 7/2013 |
| WO | 2006101668 A2 | 9/2006 |
| WO | 2009115480 A1 | 9/2009 |
| WO | WO 2014/071996 | 5/2014 |
| WO | WO-2016/081659 A1 | 5/2016 |

OTHER PUBLICATIONS

Aslam, Faisal, et al., "NPP: A Facility Based Computation Framework for Restoration Routing Using Aggregate Link Usage Information," Proceedings of QoS-IP: quality of service in multiservice IP network, Feb. 2005, pp. 150-163.

Boucadair, M., et al., "Analysis of Solution Candidates to Reveal a Host Identifier (HOST ID) in Shared Address Deployments," IETF INTAREA WG Internet-Draft draft-ietf-intarea-nat-reveal-analysis-05, Feb. 14, 2013, 22 pages.

Chandy, K. Mani, et al., "Distribution Snapshots: Determining Global States of Distributed Systems," ACM Transaction on Computer Systems, Feb. 1985, vol. 3, No. 1, pp. 63-75.

Khasnabish, Bhumip, et al., "Mobility and Interconnection of Virtual Machines and Virtual Network Elements; draft-khasnabish-vmmi-problems-03.txt," Network Working Group, Dec. 30, 2012, pp. 1-29.

Kodialam, Murali, et. al, "Dynamic Routing of Locally Restorable Bandwidth Guaranteed Tunnels using Aggregated Link Usage Information," Proceedings of IEEE INFOCOM, 2001, vol. 1, pp. 376-385.

Li, Li, et. al, "Routing Bandwidth Guaranteed Paths with Local Restoration in Label Switched Networks," IEEE Journal on Selected Areas in Communications, Feb. 7, 2005, vol. 23, No. 2, pp. 1-11.

Mahalingam, M., et al. "VXLAN: A Framework for Overlaying Virtualized Layer 2 Networks over Layer 3 Networks," VXLAN, Internet Engineering Task Force, Internet Draft, located at https://tools.ietf._org/html/draft-mahalingam-dutt-dcops-vxlan-06, Oct. 2013, pp. 1-24.

Moncaster, T., et al., "The Need for Congestion Exposure in the Internet", Oct. 26, 2009, Internet-Draft, pp. 1-22.

Narten, T., et al., "Problem Statement: Overlays for Network Virtualization," draft-ietf-nvo3-overlay-problem-statement-04, Internet Engineering Task Force, Jul. 31, 2013, pp. 1-24.

Pan, P., et. al, "Fast Reroute Extensions to RSVP-TE for LSP Tunnels," RFC-4090. May 2005, pp. 1-38.

Raza, Saqib, et al., "Online Routing of Bandwidth Guaranteed Paths with Local Restoration using Optimized Aggregate Usage Information," IEEE-ICC '05 Communications, May 2005, vol. 1, 8 pages.

Sinha, Shan, et al., "Harnessing TCP's Burstiness with Flowlet Switching," Nov. 2004, 6 pages.

Spijker, Rick Van't, "Dissertation Module for Master of Science—Mobile and Distributed Computer Networks," Leeds Metropolitan University, May 31, 2010, pp. 1-78.

Yourtchenko, D., et al., "Revealing hosts sharing an IP address using TCP option," Network Working Group Internet Draft draft-wing-nat-reveal-option-03.txt, Dec. 8, 2011, 10 pages.

International Search Report and Written Opinion dated Feb. 25, 2015 for corresponding PCT Application No. PCT/US2014/063555.

Cisco, At-A-Glance Brochure, "Cisco Fabric Path," 2010, 2 pages; http://www.cisco.com/en/US/prod/collateral/switches/ps9441/ps9402/at_a_glance_c45-605626.pdf.

Cisco, Design Guide, "Cisco FabricPath Design Guide: Using Fabric Path with an Aggregation and Access Topology," 2011, 53 pages; http://www.cisco.com/en/US/prod/collateral/switches/ps9441/ps9670/guide_c07-690079.pdf.

Cisco, Guide, "Intermediate System-to-Intermediate System (IS-IS) TLVs, Document ID 5739," updated Aug. 10, 2005, 7 pages; http://www.cisco.com/image/gif/paws/5739/tivs_5739.pdf.

Cisco, White Paper, "Cisco Fabric Path for Cisco Nexus 7000 Series Switches," Sep. 7, 2011, 44 pages; http://www.cisco.com/en/US/prod/collateral/switches/ps9441/ps9402/white_paper_c11-687554.pdf.

(56) References Cited

OTHER PUBLICATIONS

Eastlake, et al., "Proposed Standard, RBridges: TRILL Header Options," TRILL Working Group Internet-Draft, Dec. 24, 2009, 18 pages; http://tools.ietf.org/html/draft-ietf-trill-rbridge-options-00.

Eastlake, et al., "Proposed Standard, RBridges: Further TRILL Header Options," TRILL Working Group Internet Draft, Dec. 1, 2011, 20 pages; http://tools.ietf.org/html/draft-ietf-trill-rbridge-options-06.

Eastlake, et al., "Transparent Interconnection of Lots of Links (TRILL) Use of IS-IS," RFC 6326, Jul. 2011, 26 pages; http://tools.ietf.org/html/rfc6326.

Eastlake, et al., "Routing Bridges (RBridges): Adjacency," RFC 6327, Jul. 2011, 27 pages; http://tools.ietf.org/html/rfc6327.

Leiserson, Charles E., "Fat-Trees: Universal Networks for Hardware-Efficient Supercomputing," IEEE Transactions on Computers, vol. c-34, No. 10, Oct. 1985, 10 pages; http://courses.csail.mitedu/6.896/spring04/handouts/papers/fat_trees.pdf.

Perlman, et al., "Introduction to TRILL," The Internet Protocol Journal, vol. 14, No. 3, Sep. 2011, 19 pages; http://www.cisco.com/web/about/ac123/ac147/archived_issues/ipj_14-3/143_trill.html.

Perlman, et al., "Routing Bridges (RBridges): Base Protocol Specification," RFC 6325, Jul. 2011, 100 pages; http://tools.ietf.org/html/rfc6325.

Touch, et al., "Transparent Interconnection of Lots of Links (TRILL): Problem and Applicability Statement," RFC 5556, May 2009, 18 pages; http://tools.ietf.org/html/rfc5556.

Notification of Transmittal of the International Search Report and the Written Opinion of the International Search Authority, or the Declaration dated Feb. 10, 2016 in PCT Application No. PCT/US2015/061429 in 13 pages.

Brocade Communications Systems, Inc., "Multi-Chassis Trunking for Resilient and High-Performance Network Architectures," White Paper, vvww_brocade.com, 2010, 8 pages.

Cisco Systems, Inc., "Design and Configuration Guide: Best Practices for Virtual Port Channels (vPC) on Cisco Nexus 7000 Series Switches," Revised Aug. 2014, 116 pages.

Cisco Systems, Inc., "Chapter 2: Virtual Port Channel Operations," Cisco Nexus 5000 Series NX-OS Operations Guide, Release 5.0(3)N2(1), Jun. 11, 2012, 18 pages.

International Search Report and Written Opinion from the International Searching Authority, dated Aug. 28, 2017, for the corresponding International Application No. PCT/US2017/033909, 12 pages.

Cisco Systems, Inc., "Cisco Nexus 1000V VXLAN Configuration Guide, Release 4.2(1)SV2(2.1), Chapter 1, Information About VXLANs," Jun. 21, 2013, 6 pages.

Onisick, Joe, "VXLAN Deep Dive," Genesis Framework, Wordpress, Nov. 6, 2012, 8 pages.

VMware, Inc., "VMware Network Virtualization Design Guide, Technical White Paper," Jan. 2013, 25 pages.

Schaumann, Jan, "L3DSR—Overcoming Layer 2 Limitations of Direct Server Return Load Balancing," NANOG 51, Miami, Jan. 30, 2011, 33 pages.

WIKIPEDIA®, "X-Forwarded-For," retrieved and printed from Internet Mar. 9, 2018, 4 pages; http://en.wikipedia.org/w/index.php?title=X-Forwarded-For&oldid=542207414.

* cited by examiner

VIRTUAL PORT CHANNEL BOUNCE IN OVERLAY NETWORK

CROSS-REFERENCE TO RELATED APPLICATIONS

This application is a Continuation of U.S. application Ser. No. 14/508,909, filed Oct. 7, 2014, and entitled "VIRTUAL PORT CHANNEL BOUNCE IN OVERLAY NETWORK," which claims the benefit of U.S. Provisional Application No. 61/900,333, filed Nov. 5, 2013, and entitled "EXPLICIT CONGESTION NOTIFICATION IN AN OVERLAY NETWORK," both of which are incorporated by reference in their entirety.

BACKGROUND

1. Field

The subject technology relates to methods and systems for preventing packet loss and in particular, for avoiding packet loss by bouncing packets in response to a link failure event detected in a virtual port channel.

2. Introduction

The soaring demand for network data throughout the globe has steadily fueled the evolution of networking technologies, as engineers and manufacturers rush to keep pace with the changing data consumption landscape and increasing network scalability requirements. Various network technologies have been developed to meet the demand for network data. For example, overlay network solutions, such as virtual extensible local area networks (VXLANs), as well as virtualization and cloud computing technologies, have been widely implemented.

In some network implementations, overlay solutions are used to allow virtual networks to be created over a physical network infrastructure. Accordingly, overlay networks allow network administrators to expand a current physical network infrastructure through the use of virtual networks. Overlay networks can also provide logical network isolation, which allow data centers or providers to host a large number of customers (i.e., "tenants") while providing each customer their own isolated network domain.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
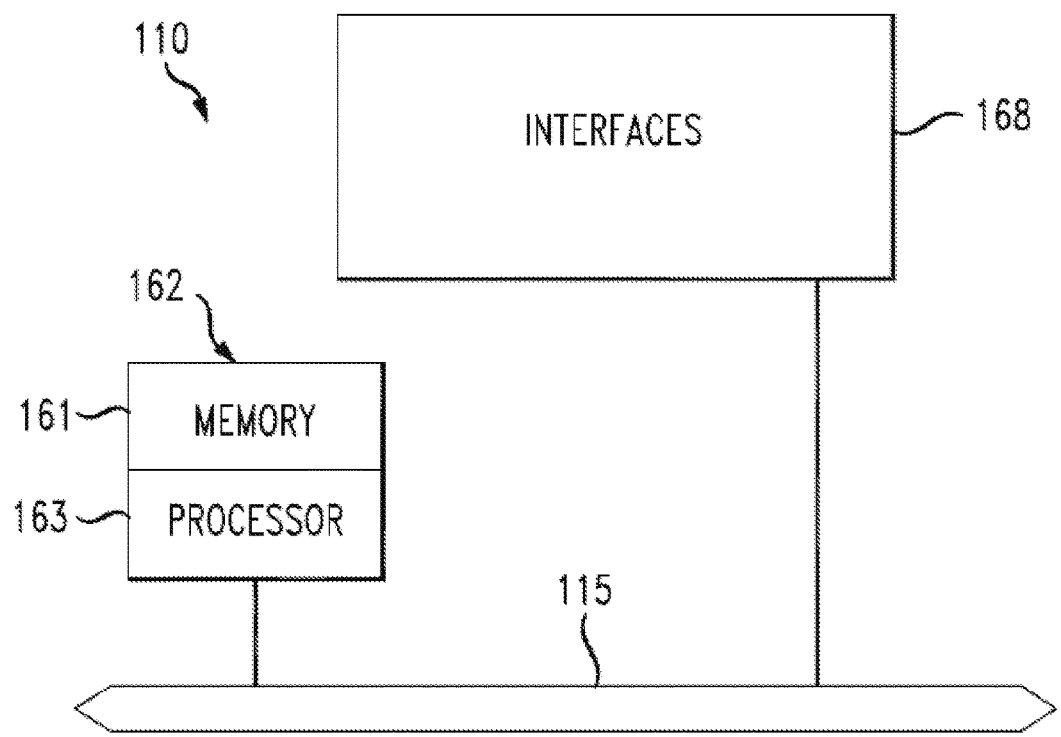
FIG. 1 illustrates an example network device, according to certain aspects of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communication links located in the same geographic region, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme that allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNID), such as a VXLAN network identifier, which can specifically identify an associated virtual segment or domain.

Description

In some overlay implementations, virtual port channels (VPCs) are used to logically link or combine different network elements, for example, using a shared address. Packets transmitted over a VPC may be directed to an address of the VPC, or specifically addressed to an individual VPC member switch. In conventional overlay networks utilizing VPCs, link failures (e.g., as between one VPC member and a connected node), can result in significant packet loss for in-transit packets that are sent to a shared address and arrive at a VPC member switch with a broken link. That is, during the time required to propagate a link failure event by a respective switch (e.g., to adjust rerouting addresses), significant packet loss can be incurred for in-transit packets which contain outdated address information i.e., relating to an unavailable destination or way point.

The disclosed technology addresses the foregoing problem by providing methods and systems to detect a link failure event and to reroute packets away from a broken link, e.g., by forwarding inbound packets to a VPC partner switch or tunnel end-point (TEP). As will be discussed in further detail below, methods of the subject technology can be implemented by detecting a link failure and rewriting encapsulation information for inbound packets that cannot be transmitted using their original address information. Because address information of partner switches in a VPC are known by all VPC members, the relevant TEP can quickly rewrite/modify inbound packet encapsulation information (addresses), forwarding inbound traffic to an available VPC partner. By rewriting packet encapsulation information more quickly than rerouting decisions can be implemented elsewhere in the network architecture, the rewriting TEP can "bounce" packets to a VPC partner switch, without realizing packet loss during the latency period in which re-routing decisions are propagated throughout the network.

Figure 2:
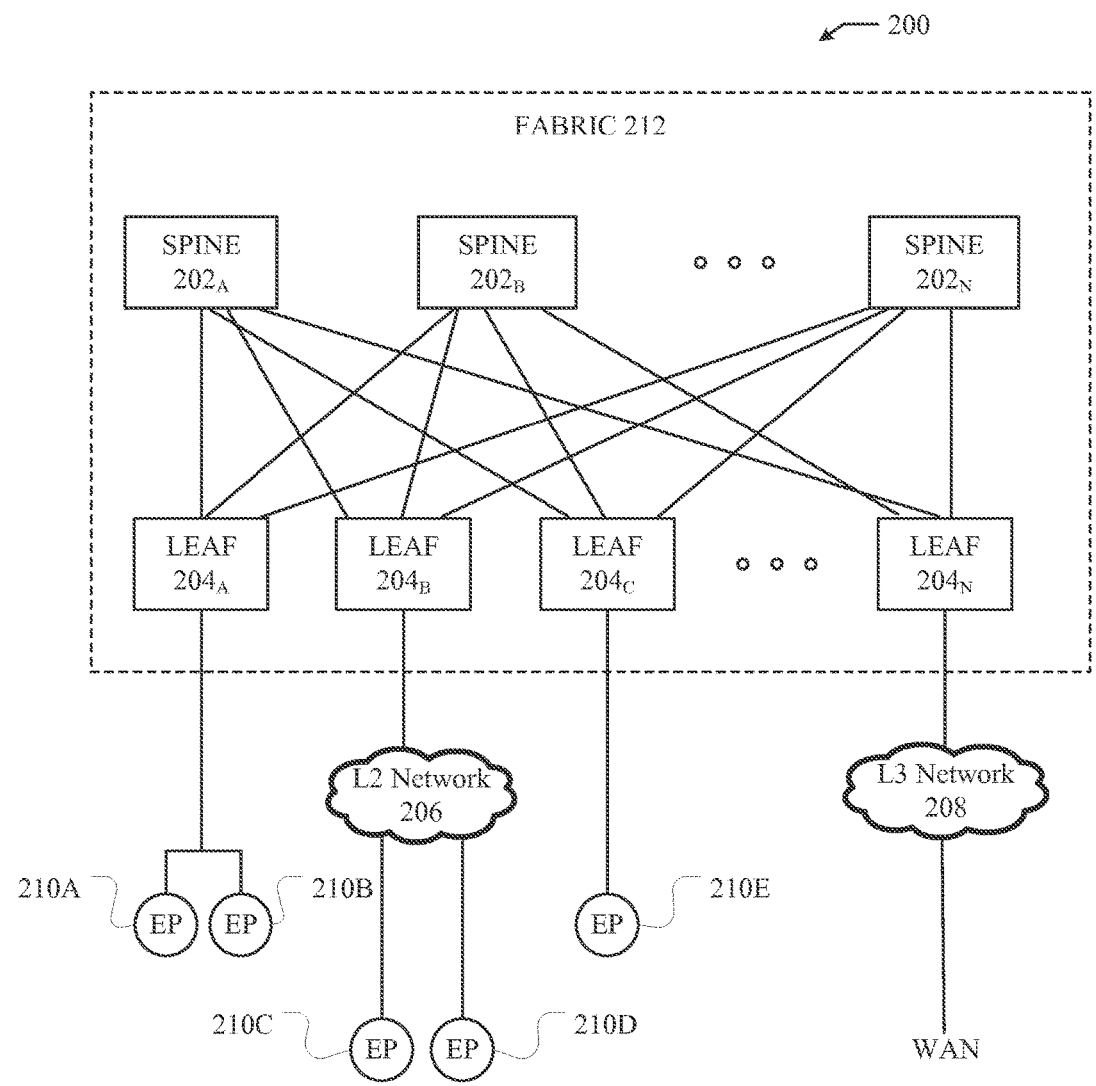
FIG. 2 illustrates a schematic block diagram of an example network fabric, according to some implementations of the subject technology.
Figure 3:
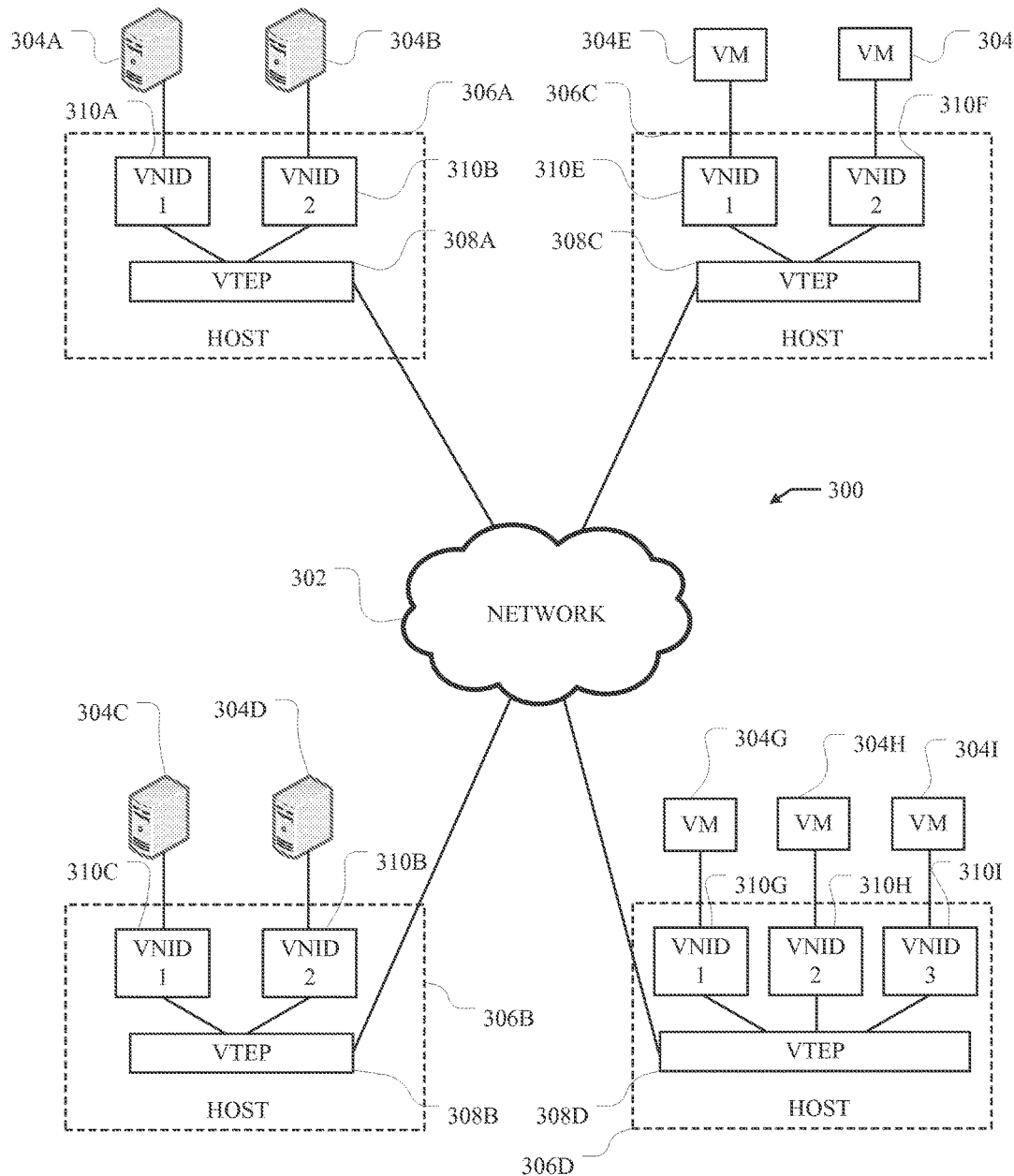
FIG. 3 illustrates a schematic diagram of an example overlay network, according to some implementations of the subject technology.

A brief introductory description of example systems and networks, as illustrated in FIGS. 1 through 3, is disclosed herein. FIG. 1 illustrates an example network device 110 suitable for implementing the present invention. Network device 110 includes a master central processing unit (CPU) 162, interfaces 168, and bus 115 (e.g., a PCI bus). When acting under the control of appropriate software or firmware, CPU 162 is responsible for executing packet management, error detection, and/or routing functions, such as miscabling detection functions, for example. The CPU 162 can accomplish all these functions under the control of software including an operating system and any appropriate applications software. CPU 162 may include one or more processors 163 such as a processor from the Motorola family of microprocessors or the MIPS family of microprocessors. In alternative aspects, processor 163 is specially designed hardware for controlling the operations of router 110. In a specific implementation, memory 161 (such as non-volatile RAM and/or ROM) also forms part of CPU 162. However, there are many different ways in which memory could be coupled to the system.

Interfaces 168 are typically provided as interface cards (sometimes referred to as "line cards"). Generally, they control the sending and receiving of data packets over the network and sometimes support other peripherals used with router 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like.

Although the system shown in FIG. 1 is one specific network device of the present invention, it is not the only network device architecture on which aspects of the subject technology can be implemented. For example, an architecture having a single processor that handles communications as well as routing computations, etc. is often used. Further, other types of interfaces and media may also be implemented.

FIG. 2 illustrates a schematic block diagram of an example architecture 200 for a network fabric 212. Network fabric 212 can include spine switches 202A, 202B, . . . , 202N (collectively "202") connected to leaf switches 204A, 204B, 204C, . . . , 204N (collectively "204") in network fabric 212.

Spine switches 202 can be L2 switches in fabric 212; that is, spine switches 202 can be configured to perform L2 functionalities. Further, spine switches 202 can support various capabilities, such as 40 or 10 Gbps Ethernet data transfer speeds. In some implementations, one or more of spine switches 202 can be configured to host a proxy function that performs a lookup of the endpoint address identifier to locator mapping in a mapping database on behalf of leaf switches 204 that do not have such mapping. The proxy function can do this by parsing through the packet to the encapsulated tenant packet to get to the destination locator address of the tenant. Spine switches 202 can then perform a lookup of their local mapping database to determine the correct locator address of the packet and forward the packet to the locator address without changing certain fields in the header of the packet.

When a packet is received at spine switch 202$i$, spine switch 202$i$ can first check if the destination locator address is a proxy address. If so, spine switch 202$i$ can perform the proxy function as previously mentioned. If not, spine switch 202$i$ can lookup the locator in its forwarding table and forward the packet accordingly.

Spine switches 202 connect to leaf switches 204 in fabric 212. Leaf switches 204 can include access ports (or non-fabric ports) and fabric ports. Fabric ports can provide uplinks to spine switches 202, while access ports can provide connectivity for devices, hosts, endpoints, VMs, or external networks to fabric 212.

Leaf switches 204 can reside at the edge of fabric 212, and can thus represent the physical network edge. In some cases, leaf switches 204 can be top-of-rack ("ToR") switches configured according to a ToR architecture. In other cases, leaf switches 204 can be aggregation switches in any particular topology, such as end-of-row (EoR) or middle-of-row (MoR) topologies. In some aspects, leaf switches 204 can also represent aggregation switches, for example.

Leaf switches 204 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, leaf switches 204 can contain virtual switching functionalities, such as a virtual tunnel endpoint (VTEP) function as explained below in the discussion of VTEP 308 in FIG. 3. To this end, leaf switches 204 can connect fabric 212 to an overlay network, such as overlay network 300 illustrated in FIG. 3.

Network connectivity in the fabric 212 can flow through leaf switches 204. Here, leaf switches 204 can provide servers, resources, endpoints, external networks, or VMs access to fabric 212, and can connect leaf switches 204 to each other. In some cases, leaf switches 204 can connect EPGs to fabric 212 and/or any external networks. Each EPG can connect to fabric 212 via one of leaf switches 204, for example.

Endpoints 210A-E (collectively "210") can connect to fabric 212 via leaf switches 204. For example, endpoints 210A and 210B can connect directly to leaf switch 204A, which can connect endpoints 210A and 210B to fabric 212 and/or any other one of leaf switches 204. Similarly, endpoint 210E can connect directly to leaf switch 204C, which can connect endpoint 210E to fabric 212 and/or any other of leaf switches 204. On the other hand, endpoints 210C and 210D can connect to leaf switch 204B via L2 network 206. Similarly, the wide area network (WAN) can connect to leaf switches 204C or 204D via L2 network 208.

FIG. 3 illustrates an example overlay network 300. Overlay network 300 uses an overlay protocol, such as VXLAN, VGRE, VO3, or STT, to encapsulate traffic in L2 and/or L3 packets which can cross overlay L3 boundaries in the network. As illustrated in FIG. 3, overlay network 300 can include hosts 306A-D interconnected via network 302.

Network 302 can include any packet network, such as an IP network, for example. Moreover, hosts 306A-D include virtual tunnel end points (VTEP) 308A-D, which can be virtual nodes or switches configured to encapsulate and de-encapsulate data traffic according to a specific overlay protocol of the network 300, for the various virtual network identifiers (VNIDs) 310A-I. Moreover, hosts 306A-D can include servers containing a virtual tunnel endpoint functionality and virtual workloads. However, in some cases, one or more hosts can also be a physical switch, such as a ToR switch, configured with a virtual tunnel endpoint functionality. For example, hosts 306A and 306B can be physical switches configured with a VTEP. Here, the hosts 306A and 306B can be connected to servers 303A-D, which can include virtual workloads through VMs, for example.

In some embodiments, network 300 can be a VXLAN network, and VTEPs 308A-D can be VXLAN tunnel end points. However, as one of ordinary skill in the art will readily recognize, network 300 can represent any type of overlay or software-defined network, such as NVGRE, STT, or even overlay technologies yet to be invented.

The VNIDs can represent the segregated virtual networks in overlay network 300. Each of the overlay tunnels (VTEPs 308A-D) can include one or more VNIDs. For example, VTEP 308A can include VNIDs 1 and 2, VTEP 308B can include VNIDs 1 and 3, VTEP 308C can include VNIDs 1 and 2, and VTEP 308D can include VNIDs 1-3. As one of ordinary skill in the art will readily recognize, any particular VTEP can, in other embodiments, have numerous VNIDs, including more than the 3 VNIDs illustrated in FIG. 3.

The traffic in overlay network 300 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Endpoints and VMs 303A-I can connect to their respective VNID or virtual segment, and communicate with other endpoints or VMs residing in the same VNID or virtual segment. For example, endpoint 303A can communicate with endpoint 303C and VMs 303E and 303G because they all reside in the same VNID, namely, VNID 1. Similarly, endpoint 303B can communicate with VMs 303F, H because they all reside in VNID 2.

VTEPs 308A-D can encapsulate packets directed at the various VNIDs 1-3 in overlay network 300 according to the specific overlay protocol implemented, such as VXLAN, so traffic can be properly transmitted to the correct VNID and recipient(s). Moreover, when a switch, router, or other network device receives a packet to be transmitted to a recipient in overlay network 300, it can analyze a routing table, such as a lookup table, to determine where such packet needs to be transmitted so the traffic reaches the appropriate recipient. For example, if VTEP 308A receives a packet from endpoint 303B that is intended for endpoint 303H, VTEP 308A can analyze a routing table that maps the intended endpoint, endpoint 303H, to a specific switch that is configured to handle communications intended for endpoint 303H. VTEP 308A might not initially know, when it receives the packet from endpoint 303B, that such packet should be transmitted to VTEP 308D in order to reach endpoint 303H. Accordingly, by analyzing the routing table, VTEP 308A can lookup endpoint 303H, which is the intended recipient, and determine that the packet should be transmitted to VTEP 308D, as specified in the routing table based on endpoint-to-switch mappings or bindings, so the packet can be transmitted to, and received by, endpoint 303H as expected.

However, continuing with the previous example, in many instances, VTEP 308A may analyze the routing table and fail to find any bindings or mappings associated with the intended recipient, e.g., endpoint 303H. Here, the routing table may not yet have learned routing information regarding endpoint 303H. In this scenario, the VTEP 308A can broadcast or multicast the packet to ensure the proper switch associated with endpoint 303H can receive the packet and further route it to endpoint 303H.

Figure 4:
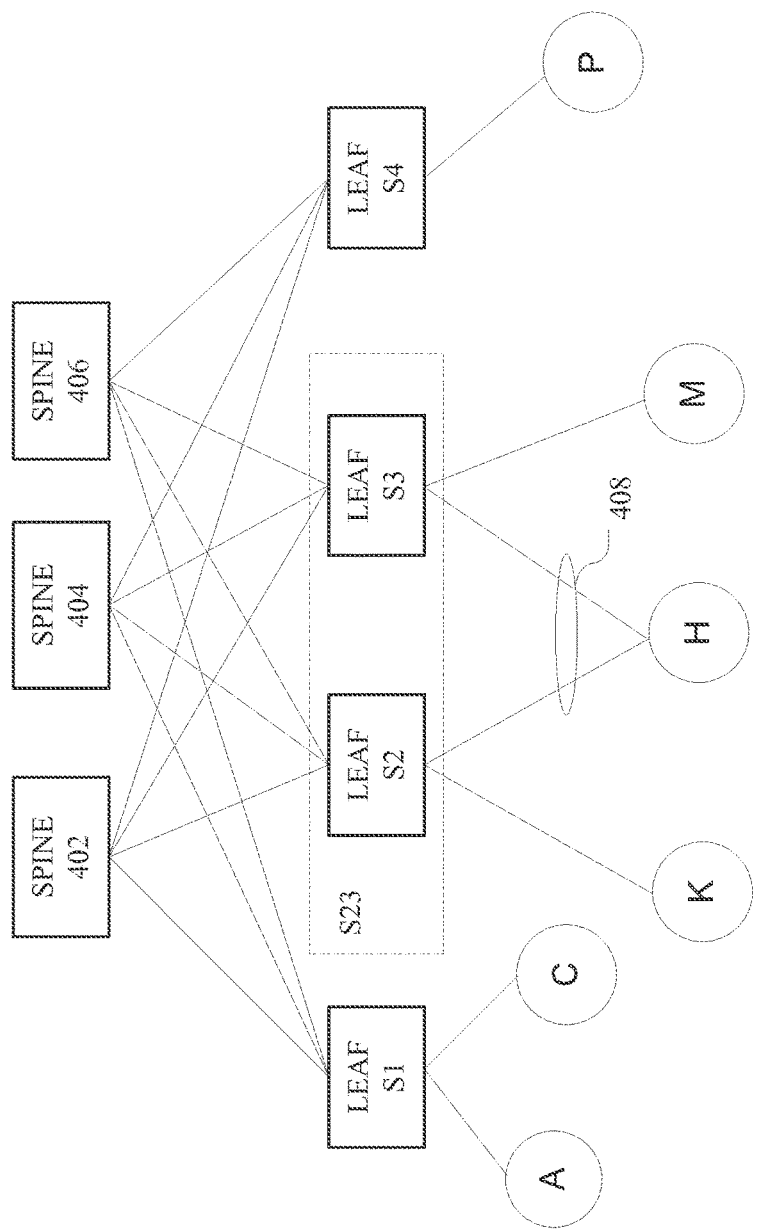
FIG. 4 illustrates an example of an overlay network in which a virtual port channel can be implemented.

FIG. 4 illustrates an example of an overlay network 400 in which a virtual port channel (e.g., virtual port channel 408) can be implemented. Although overlay network 400 illustrates a full-bipartite topology, aspects of the technology are not limited to the topology illustrated in the example of FIG. 4. Rather, it is understood that implementations of the technology can be applied to networking systems that utilize VPCs in an overlay network, independent of network topology.

Network 400 includes multiple spines (e.g., spines 402, 404, and 406), as well as multiple TEPs (e.g., leaf S1, S2, S3 and S4). In turn, each TEP is connected to one or more nodes (e.g., A, C, K, H, M and/or P). Specifically, leaf S1 is connected to nodes A and C. Leaf S2 and leaf S3 are members of peer-switch S23. As configured, leaf S2 is connected to node K, and leaf S3 is connected to node M, whereas leaf S2 and leaf S3 (as part of peer-switch S23) connected to node H, for example, via VPC 408. In this configuration, node K and node M are linked to leaf S2 and leaf S3, irrespective of VPC 408.

In the example of FIG. 4, the connection between spines 402, 404, and 406 and each leaf (e.g., leaf S1, leaf S2, leaf S3 and leaf S4), are shown in a full-bipartite graph topology; however, other topologies can be implemented. As discussed above, leaf S2 and leaf S3 form a virtual pair, e.g., in peer-switch S23. Although peer-switch S23 is shown to include leaf S2 and leaf S3, it is understood that a greater number of switches may be included, without departing from the scope of the invention.

In practice, each member of a peer-switch is configured to retain address information of each other member switch in the virtual group. Accordingly, in the example of FIG. 4, leaf S2 is pre-configured with the address information for leaf S3. Likewise, leaf S3 is pre-configured with address information for leaf S2. Using pre-configured address information of partner switches within the same peer-switch, a switch connected to a failed link can be configured to automatically forward/redirect incoming packets so that they "bounce" to a partner switch.

By way of example, if a link from leaf S3 to node H were to fail, packets transmitted to node H would need to be routed through leaf S2 (e.g., to reach node H via the leaf S2-node H link). However, if an incoming packet, for example originating from node A, is sent to node H, (e.g., addressed to VPC 23), there is a possibility that the packet would arrive at leaf S3. In conventional implementations, if link failure detection and address forward information is not updated before the packet arrives at leaf S3, the packet is lost, as it cannot be transmitted over the failed VPC link (e.g., from S3 to H).

Implementations of the subject technology avoid the foregoing problem by providing VPC switches configured to implement a forwarding decision upon detection of a link fail event in a virtual port channel (such as VPC 408). Further to the above example, leaf S3 can be configured to detect a failed link (e.g., the S3-H link) and in response, forward incoming packets to the peer-switch, e.g., leaf S2. Thus, a packet received by VPC 23, and received by leaf S3, can be forwarded (bounced) to leaf S2 and subsequently transmitted to node H (without being dropped). In some VPC switches implemented in an overlay network, packets can be forwarded by simply rewriting/changing a destination address in the packet encapsulation information and forwarding the packet based on the updated encapsulation information.

When implemented in the context of a VPC arrangement, the bouncing method of the subject technology provides improved network response to link failure events, since the nearest network element (e.g., leaf S3) is positioned to most quickly detect a fail event and bounce incoming traffic to a partner switch.

In some implementations, all paths to a destination node may fail. Further to the above example, the S3-H link may fail concurrently with a failure of the S2-H link. In such instances, a packet bounced from leaf S3 (to leaf S2) may be bounced back to leaf S3, e.g., in an endless loop. To avoid the possibility of endless packet bounce, each VPC partner switch can be configured so that the forwarding decision is based on whether or not a received packet was previously bounced.

In certain aspects, the first bounce is indicated by the bouncing switch, for example, by flipping a bit in the packet encapsulation information to indicate the initial packet bounce. Thus, a VPC partner switch (e.g., leaf S2) receiving a bounced packet (e.g., from leaf S3), can disregard the bounced packets to avoid problem of an infinite bounce. That is, a VPC switch receiving a packet can determine (1) whether the received packet has already been bounced by a VPC partner, and (2) if the received switch would bounce the packet back to the transmitting VPC partner. In scenarios where conditions (1) and (2) are both true, the received packet is discarded to avoid a bouncing loop.

Figure 5:
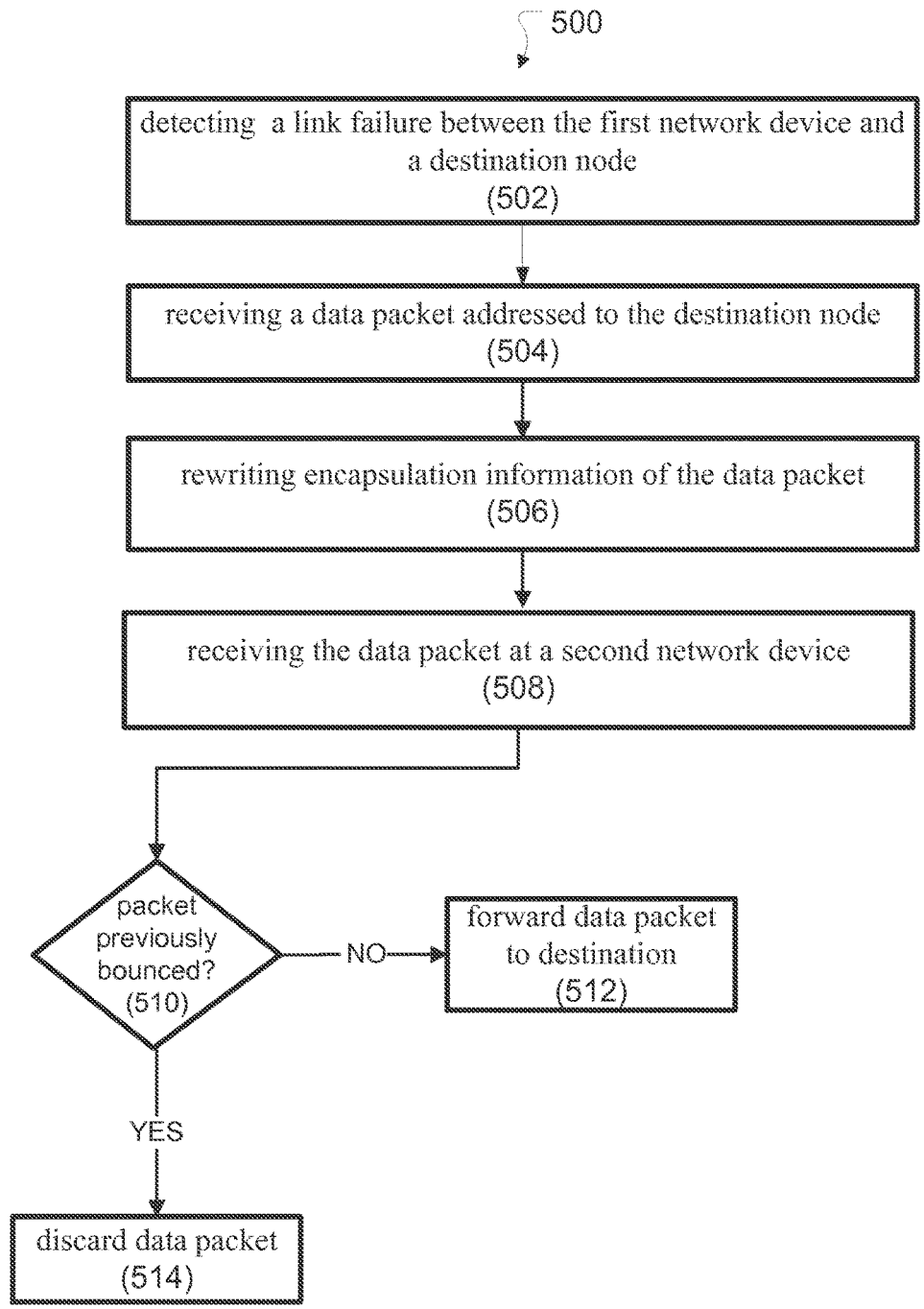
FIG. 5 illustrates a block diagram of an example method for responding to a link failure, according to some implementations of the technology.

FIG. 5 illustrates a block diagram of an example method 500 for implementing a VPC packet bounce in an overlay network, according to some aspects of the technology. Method 500 begins with step 502, in which a link failure event is detected, e.g., between a first network device and a destination node. In practice, the first network device is a member switch of a virtual port channel, and is configured with address information for the VPC, as well as address information for all other switches in the same VPC.

In step 504 data packet is received by the first network device and addressed to the destination node. Upon receiving the data packet, and in response to detection of the link failure even in step 502, the first network device implements a forwarding decision i.e., to bounce the received packet to a VPC partner.

In step 506, the forwarding decision is implemented when packet encapsulation information (e.g., a TEP address in the packet header) is re-written/modified to include an address of a VPC partner switch. Subsequently, the packet is forwarded to a VPC partner.

In some implementations, before the packet is forwarded, packet encapsulation information is modified to indicate that the packet has been forwarded (bounced). As discussed in further detail below, previously bounced packets may be discarded by a receiving VPC partner switch to avoid the possibility of a forwarding loop.

In step 508, the packet is received at a second network device, which is a VPC partner of the first network device that originally detected the link fail event. Once the second network device receives the packet, process 500 advances to decision step 510 in which the second network device determines whether the packet was previously bounced.

In practice, the second network device may determine whether a previous bounce occurred by looking at the contents of the packet header. If the packet header indicates that the received packet was not previously bounced, then a forwarding decision is implemented at the second network device and the packet is forwarded to its next destination in the network. Alternatively, if in decision step 510 it is determined that the received packet was previously bounced, process 500 proceeds to step 514, wherein the received packet is discarded so as to avoid a forwarding loop, as between the first network device and the second network device.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect cvsn refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method comprising:
   detecting, by a first network device in a virtual port channel, a link failure between the first network device and a destination node;
   receiving, by the first network device, a first data packet addressed to the destination node;
   in response to detecting the link failure, forwarding, the first data packet to a second network device, wherein the second network device is paired with the first network device in the virtual port channel; and
   rewriting encapsulation information of the first data packet to include an indication of an initial packet bounce of the first data packet.

2. The computer-implemented method of claim 1, wherein forwarding the first data packet comprises:
   updating the encapsulation information to include an address of the second network device.

3. The computer-implemented method of claim 2, wherein rewriting the encapsulation information further comprises:
   transmitting the first data packet to the second network device for forwarding to the destination node.

4. The computer-implemented method of claim 2, wherein rewriting the encapsulation information further comprises modifying an outer tunnel-end-point (TEP) destination address of the first data packet.

5. The computer-implemented method of claim 1, wherein the indication in the encapsulation information is that the first data packet was undeliverable by the destination node.

6. The computer-implemented method of claim 5, wherein the first data packet is discarded by the second network device based on the indication in the encapsulation information that the first data packet was undeliverable by the destination node.

7. The computer-implemented method of claim 1, wherein the first network device is configured to retain an address of the second network device and a shared address of the virtual port channel.

8. The computer-implemented method of claim 1, wherein the virtual port channel comprises a third network device, the third network device and the second network device each being connected to a second destination node, and
   wherein a forwarding decision for a second data packet addressed to the second destination node is made by the second network device and the first network device.

9. A system comprising:
   a first network device and a second network device, each comprising one or more processors and a computer-readable medium comprising instructions stored therein, which when executed by the processors, cause the one or more processors to perform operations comprising:
   detecting, by the first network device in a virtual port channel, a link failure between the first network device and a destination node;
   receiving, by the first network device, a first data packet addressed to the destination node;
   in response to detecting the link failure, forwarding, by the first network device, the first data packet to the second network device, wherein the second network device is paired with the first network device in the virtual port channel; and
   rewriting encapsulation information of the first data packet to include an indication of an initial packet bounce of the first data packet.

10. The system claim 9, wherein rewriting the encapsulation information further comprises:
    modifying an outer tunnel-end-point (TEP) destination address of the first data packet.

11. The system claim 9, wherein the indication in the encapsulation information is that the first data packet was undeliverable by the destination node.

12. The system of claim 11, wherein the first data packet is discarded by the second network device based on the indication in the encapsulation information that the first data packet was undeliverable by the destination node.

13. The system of claim 9, wherein the one or more processors are further configured to perform operations comprising:
    storing, at the first network device, an address of the second network device and a shared address of the virtual port channel.

14. The system of claim 9, wherein the virtual port channel comprises a third network device, the third network device and the second network device each being connected to a second destination node, and
    wherein a forwarding decision for a second data packet addressed to the second destination node is made by the second network device and the first network device.

15. A non-transitory computer-readable storage medium comprising instructions stored therein, which when executed by one or more processors, cause the processors to perform operations comprising:
    detecting, by a first network device in a virtual port channel, a link failure between the first network device and a destination node;
    receiving, by the first network device, a first data packet addressed to the destination node;
    in response to detecting the link failure, forwarding the first data packet to a second network device paired with the first network device in the virtual port channel; and
    rewriting encapsulation information of the first data packet to include an indication of an initial packet bounce of the first data packet.

16. The non-transitory computer-readable storage medium of claim 15, wherein forwarding the first data packet comprises:
    updating the encapsulation information to include an address of the second network device.

17. The non-transitory computer-readable storage medium of claim 16, wherein rewriting the encapsulation information of the first data packet further comprises:
    transmitting the first data packet to the second network device for forwarding to the destination node.

18. The non-transitory computer-readable storage medium of claim 15, wherein the indication in the encapsulation information is that the first data packet was undeliverable by the destination node.

19. The non-transitory computer-readable storage medium of claim 17, wherein the first network device is configured to retain the address of the second network device and a shared address of the virtual port channel.

20. The computer-implemented method of claim 1, wherein the indication is a flipped bit.

\* \* \* \* \*